US011679339B2

(12) United States Patent
Van de Mortel

(10) Patent No.: US 11,679,339 B2
(45) Date of Patent: Jun. 20, 2023

(54) HIGH-OUTPUT ATMOSPHERIC WATER GENERATOR

(71) Applicant: Plug Power Inc., Latham, NY (US)

(72) Inventor: Adam Van de Mortel, Houston, TX (US)

(73) Assignee: Plug Power Inc., Latham, NY (US)

(*) Notice: Subject to any disclaimer, the term of this patent is extended or adjusted under 35 U.S.C. 154(b) by 194 days.

(21) Appl. No.: 16/053,680

(22) Filed: Aug. 2, 2018

(65) Prior Publication Data
US 2020/0038776 A1 Feb. 6, 2020

(51) Int. Cl.
B01D 5/00 (2006.01)
E03B 3/28 (2006.01)

(52) U.S. Cl.
CPC .......... B01D 5/0006 (2013.01); B01D 5/009 (2013.01); B01D 5/0051 (2013.01); E03B 3/28 (2013.01)

(58) Field of Classification Search
CPC .... B01D 5/0006; B01D 5/009; B01D 5/0051; E03B 3/28; F24F 13/222; Y02A 20/00
USPC .......................................................... 62/285
See application file for complete search history.

(56) References Cited

U.S. PATENT DOCUMENTS

| | | | | |
|---|---|---|---|---|
| 4,134,274 A * | 1/1979 | Johnsen | ................ | F25B 49/027 62/182 |
| 4,351,271 A * | 9/1982 | Mueller | .................... | A01J 9/04 119/14.09 |
| 4,483,154 A * | 11/1984 | Smeal | ..................... | F25B 27/00 62/235.1 |
| 4,913,634 A | 4/1990 | Nagata et al. | | |
| 4,984,434 A * | 1/1991 | Peterson | ............... | F24F 5/0014 62/271 |
| 5,106,512 A | 4/1992 | Reidy | | |
| 5,203,989 A * | 4/1993 | Reidy | ....................... | C02F 1/18 62/93 |
| 5,517,829 A * | 5/1996 | Michael | .................... | E03B 3/28 210/764 |
| 6,442,942 B1 * | 9/2002 | Kopko | ..................... | F02C 9/28 60/773 |
| 7,272,947 B2 | 9/2007 | Anderson et al. | | |
| 7,886,547 B2 * | 2/2011 | Sullivan | .................... | E03B 3/28 62/93 |
| 7,886,557 B2 | 2/2011 | Anderson et al. | | |
| 9,482,443 B1 * | 11/2016 | Backman | ................ | F24F 13/20 |
| 2003/0000230 A1 | 1/2003 | Kopko | | |
| 2003/0010483 A1 * | 1/2003 | Ikezaki | ................ | F28F 9/0273 165/174 |
| 2003/0126875 A1 | 7/2003 | Enomoto | | |
| 2004/0040322 A1 * | 3/2004 | Engel | .................... | F24F 3/1405 62/177 |
| 2004/0173528 A1 | 9/2004 | Herrington et al. | | |
| 2004/0244398 A1 | 12/2004 | Radermacher et al. | | |

(Continued)

Primary Examiner — Eric S Ruppert
Assistant Examiner — Kirstin U Oswald
(74) Attorney, Agent, or Firm — Heslin Rothenberg Farley & Mesiti P.C.

(57) ABSTRACT

An atmospheric water generator (AWG) may be used to extract water from ambient air. A compact screw compressor of the AWG may be used to compress refrigerant, a condenser of the AWG may be used to condense refrigerant, an expansion device, and an evaporator of the AWG may be used to transfer heat from ambient air to refrigerant, causing moisture in the air to condense. The condensed moisture may be collected in a water collection unit.

25 Claims, 13 Drawing Sheets

(56) References Cited

U.S. PATENT DOCUMENTS

| | | | |
|---|---|---|---|
| 2005/0139552 A1* | 6/2005 | Forsberg | E03B 3/28 62/635 |
| 2005/0161202 A1* | 7/2005 | Merkys | F25B 39/04 165/122 |
| 2005/0188708 A1* | 9/2005 | Wills | F04C 28/08 62/175 |
| 2006/0059922 A1 | 3/2006 | Anderson et al. | |
| 2006/0201188 A1* | 9/2006 | Kopko | F25B 9/008 62/333 |
| 2007/0175063 A1 | 8/2007 | Morgan et al. | |
| 2008/0022694 A1 | 1/2008 | Anderson et al. | |
| 2009/0077992 A1 | 3/2009 | Anderson et al. | |
| 2009/0293724 A1 | 12/2009 | Ivison | |
| 2010/0083676 A1* | 4/2010 | Merritt | E03B 3/28 62/93 |
| 2010/0119366 A1* | 5/2010 | Bushnell | F04D 29/544 415/208.2 |
| 2010/0212335 A1 | 8/2010 | Lukitobudi | |
| 2012/0011865 A1 | 1/2012 | Ivison | |
| 2012/0078424 A1* | 3/2012 | Raghavachari | G05B 15/02 700/282 |
| 2013/0220906 A1* | 8/2013 | Stenhouse | E03B 3/28 165/80.1 |
| 2014/0053580 A1* | 2/2014 | Ferreira | F25D 21/006 62/140 |
| 2014/0065000 A1* | 3/2014 | Tolbert, Jr. | F04B 39/0276 418/55.4 |
| 2014/0138236 A1* | 5/2014 | White | F24F 3/14 202/185.1 |
| 2015/0362230 A1 | 12/2015 | Al-Farayedhi et al. | |
| 2017/0211851 A1* | 7/2017 | Feng | F25B 40/02 |

* cited by examiner

HIGH-OUTPUT ATMOSPHERIC WATER GENERATOR

FIELD OF THE DISCLOSURE

The instant disclosure relates to atmospheric water generation. More specifically, portions of this disclosure relate to high output atmospheric water generators.

BACKGROUND

In environments where clean and/or potable water may be in short supply atmospheric water generators (AWGs) may be used to extract water from ambient air. Such extraction may be more efficient and cost effective than transporting water from an area where water is plentiful. Water may be extracted from warm moist air by cooling the air, thus reducing a maximum humidity of the air and causing liquid water to condense. Through cooling, water can be extracted from the air when a clean and/or potable water source, such as a freshwater body or rain, is unavailable.

Atmospheric water generators may remove moisture from the air by cooling the air and collecting moisture that condenses as a result of the cooling, as shown in the AWG circuit diagram 100 of FIG. 1. For example, a fluid substance, such as refrigerant, may be used in extracting moisture from the air. At a compressor 102, vapor refrigerant may be compressed and/or heated. After it is compressed the vapor refrigerant may be in a superheated state. At the condenser 104, the superheated vapor refrigerant may be cooled and condensed into liquid form. At the expansion valve 106, pressure may be reduced on the liquid refrigerant, cooling the liquid further and reducing pressure on the liquid to transition it to a liquid/vapor refrigerant mixture. At the evaporator 108 the refrigerant may absorb heat from air adjacent to the refrigerant to condense water vapor from the air. When passing through the evaporator 108 the liquid/vapor refrigerant mixture may warm, transitioning it to saturated/superheated vapor state. Then, the vapor refrigerant may be passed to the compressor 102. Fan 110 may move air across the evaporator 108 to replace dry air from which water has been extracted with moist air. Thus, water vapor may be extracted from the ambient air by cooling the air to cause the water vapor to condense into liquid water.

Atmospheric water generators, however, can be bulky and inefficient. AWGs may have low water production capacities, requiring multiple units to produce a desired amount of water. For example, many AWGs use traditional scroll or reciprocating compressors to compress refrigerant, which have limited capacity. Given their limited capacity, multiple small scroll or reciprocating compressors may be required to realize substantial water output. Larger traditional screw type compressors require external oil cooling, external oil separators, and additional cooling capacity to cool the compressor. Traditional screw, scroll or reciprocating compressors may also be difficult and cumbersome to install and may have a bulky form factor, making such compressors less than ideal for modular or mobile operation. AWGs may also incorporate fin-tube coil condensers and evaporators made of copper tubing with aluminum fins. Fin-tube coils may be inefficient, bulky, heavy, and expensive and may have low heat transfer rates. Thus, atmospheric water generators may be bulky and inefficient with limited production capacity.

Shortcomings mentioned here are only representative and are included simply to highlight that a need exists for improved atmospheric water generators, particularly for high-output atmospheric water generators. Embodiments described herein address certain shortcomings but not necessarily each and every one described here or known in the art. Furthermore, embodiments described herein may present other benefits than, and be used in other applications than, those of the shortcomings described above.

SUMMARY

A high-output atmospheric water generator (AWG) may use advanced vapor compression refrigeration technology to deliver water at higher rates than conventional generators using one or more compact screw compressors to drive a refrigeration cycle, using vapor compression refrigeration to produce cooling and extract water from ambient air. Inclusion of compact screw compressors in place of traditional screw, scroll or reciprocating compressors enhances the efficiency of an AWG, reduce the weight of an AWG, and reduce the bulk of an AWG. The smaller size and weight of the compact screw compressor may allow production of AWGs as modular units for easy transportation and remote deployment. For example, the compact screw compressor may not require external motors, oil filters, oil reservoirs, and oil cooling systems. Additionally, compact screw compressors may have a higher refrigerating capacity than scroll or reciprocating compressors allowing for enhanced water production capacity. Compact screw compressors are also more efficient than scroll or reciprocating compressors, requiring less energy to operate the AWG. For example, compact screw compressors have a higher energy efficiency ratio (EER) than scroll or reciprocating compressors. Compact screw compressors may also incorporate high flow connection piping and isolation valves to further maximize EER. Compact screw compressors may also be precision-tuned to maximize efficiency through control of motor speed.

A high-output atmospheric water generator may also incorporate microchannel heat exchange coil evaporators and condensers to further increase efficiency and reduce bulk and weight. Microchannel heat exchange coil evaporators and condensers may have a higher efficiency than fin-tube style coils. For example, microchannel heat exchange coil evaporators and condensers may have higher heat transfer rates, closer approach temperatures, and lower airside pressure drops. Microchannel heat exchange coil evaporators and condensers may also take up less space and weigh less than fin-tube style coils. The reduced weight and area of microchannel heat exchange coil systems may allow for increased water production in a reduced form factor. For example, modular AWG units may be designed in a smaller form factor for easier transportation, while maintaining or increasing water production capacity. Microchannel heat exchange coil evaporators and condensers may also require less refrigerant to operate than fin-tube style coils, further reducing weight and operating cost. Thus, through use of microchannel heat exchange coil evaporators and condensers, the efficiency and production capacity of an AWG may be enhanced, while reducing the weight, bulk, and operating cost of the unit.

An atmospheric water generator may include a first condenser to condense refrigerant in a liquid state. For example, the condenser may transform refrigerant from a high pressure superheated vapor state to a high-pressure subcooled liquid state. The condenser may be a finned heat exchanger and may include a microchannel condenser coil. An outlet of the condenser may be coupled to an inlet of an expansion device, such as a capillary tube or expansion valve. The expansion device may reduce pressure on and further cool the refrigerant before it enters an evaporator. An outlet of the expansion device may be coupled to an inlet of a first evaporator. The first evaporator may be a finned heat exchanger and may condense water from adjacent air at air fins by transferring heat from the air to the refrigerant. For example, the refrigerant may be cold when it enters the evaporator, causing air around the evaporator to cool, reducing the amount of moisture the air is capable of holding and causing condensation to form. The first evaporator may include a microchannel evaporator coil. A water collection unit may collect water condensed by the first evaporator. For example, the first evaporator may be positioned to cause condensation to flow into the water collection unit. An outlet of the first evaporator may be coupled to an inlet of a first compact screw compressor. The compact screw compressor may compress refrigerant. For example, the compact screw compressor may receive subcooled refrigerant vapor from the evaporator, may heat and compress the refrigerant vapor, and may output superheated refrigerant vapor to the condenser via an outlet of the compressor coupled to an inlet of the condenser.

A water collection unit may collect water condensed by the first evaporator. For example, the first evaporator may be positioned to cause condensation to flow into the water collection unit. An output of the water collection unit may be coupled to a water treatment system to sterilize, filter, and mineralize the water condensed by the evaporator. The water treatment system may, for example, include one or more filters. The AWG may also include a double diaphragm water condensate pump to pump water from the water collection unit through the water treatment system. A high-output AWG may have a water production capacity up to or exceeding approximately 10,000 gallons per day and may produce water that is safe for human consumption.

The AWG may include one or more fans, such as vane-axial fans, to move air through the system. For example, one or more vane-axial fans can expel cooled air from which moisture has been extracted from the AWG while pulling warm moist air into the AWG. The vane-axial fans may further act to move cooled air across a condenser to cool the refrigerant in the condenser before expelling the air.

The AWG may include a subcooling heat exchange system coupled between the condenser outlet and the evaporator inlet to further cool refrigerant flowing from the condenser to the evaporator. The subcooling heat exchange system may, for example, provide additional cooling of the refrigerant to enhance the efficiency and output of microchannel condensers and evaporators. In some embodiments, the subcooling heat exchange system may be coupled between the outlet of the condenser and the inlet of the expansion device. The additional refrigerant cooling provided by the subcooling system may also provide increased operational flexibility in environments with higher ambient temperatures. The subcooling heat exchange system may include one or more direct expansion heat exchangers to transfer cooling from refrigerant of a discrete subcooling heat exchange circuit to refrigerant of the primary AWG circuit, described above. The subcooling system may further include a heat rejection unit to cool the subcooling heat exchange system. The heat rejection unit may include one or more airfoil axial fans to cool the subcooling system. Airflow of the subcooling system provided by the one or more airfoil axial fans may be isolated from the first evaporator.

The AWG may include one or more variable frequency drives (VFDs) configured to control one or more motors of the system. For example, the variable frequency drives may control speeds of the compact screw compressors, the airfoil axial fans, the vane-axial fans, and other motors of the system. Variable frequency drives may be used to tune fan speeds in the AWG, in both the main water extraction system and the subcooling system to tune airflow for maximum water extraction. A variable frequency drive may control a pump for transferring water from the water collection unit through the water treatment system.

In some embodiments, the first condenser, expansion device, evaporator and compact screw compressor may form a first AWG circuit. A second AWG circuit, including a second condenser, a second expansion device, a second evaporator, and a second compact screw compressor, may share a water collection unit to collect water from the first evaporator and the second evaporator. The first and second AWG circuits may also share a water treatment system for sterilizing, filtering, and mineralizing water from the shared water collection unit.

A method for condensing water may include compressing refrigerant using a first compact screw compressor. The refrigerant may then be transferred from the first compact screw compressor to a first condenser. The refrigerant may then be condensed to a liquid state by the first condenser. After the refrigerant is condensed, it may be transferred to an expansion device. The expansion device may reduce the pressure on and further cool the refrigerant. The refrigerant may then be transferred to a first evaporator. Water may be condensed from air adjacent to the first evaporator by transferring heat from the air adjacent to the first evaporator to refrigerant inside the first evaporator. Refrigerant may then be transferred from the first evaporator to the first compact screw compressor.

Dry, cool, air from an area adjacent to the first evaporator may be removed and replaced with moist air using a vane-axial fan. In some embodiments, the refrigerant may be further cooled while it is being transferred from the first condenser to the first expansion device using a subcooling heat exchange system to absorb heat from the refrigerant. The subcooling heat exchange system may be further cooled using a heat rejection unit of the subcooling heat exchange system.

Water condensed by the evaporator may be collected in a water collection unit and a pump may be operated to transfer the collected water through a water treatment system to treat the collected water. Additional compact screw compressors, condensers, expansion devices, and evaporators may be included in additional AWG circuits for performing steps of condensing refrigerant, cooling refrigerant, transferring refrigerant, and condensing water from the air by transferring heat from the air to the refrigerant. In some embodiments, multiple AWG circuits may share a water collection unit and water treatment system.

In some embodiments, one or more AWG circuits and subcooling heat exchange systems may be packaged in an AWG module. For example, multiple discrete AWG modules may include sets of one or more compact screw compressors, one or more condensers, one or more expansion devices and one or more evaporators. Discrete AWG modules may each have individual water collection units, pumps, and water treatment systems, or they may share water collection units, pumps, and water treatment systems.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

High-output atmospheric water generators may be used to generate a water supply by extracting moisture from ambient air. Refrigerant may be cycled through the AWG to cool air, causing water in the air to condense. Fans may move air through the AWG so that when air is cooled and water is extracted warm, moist, air may be brought in to replace the cool dry air for continued water extraction. High-output atmospheric water generators can produce in excess of 10,000 gallons of water a day.

Figure 1:
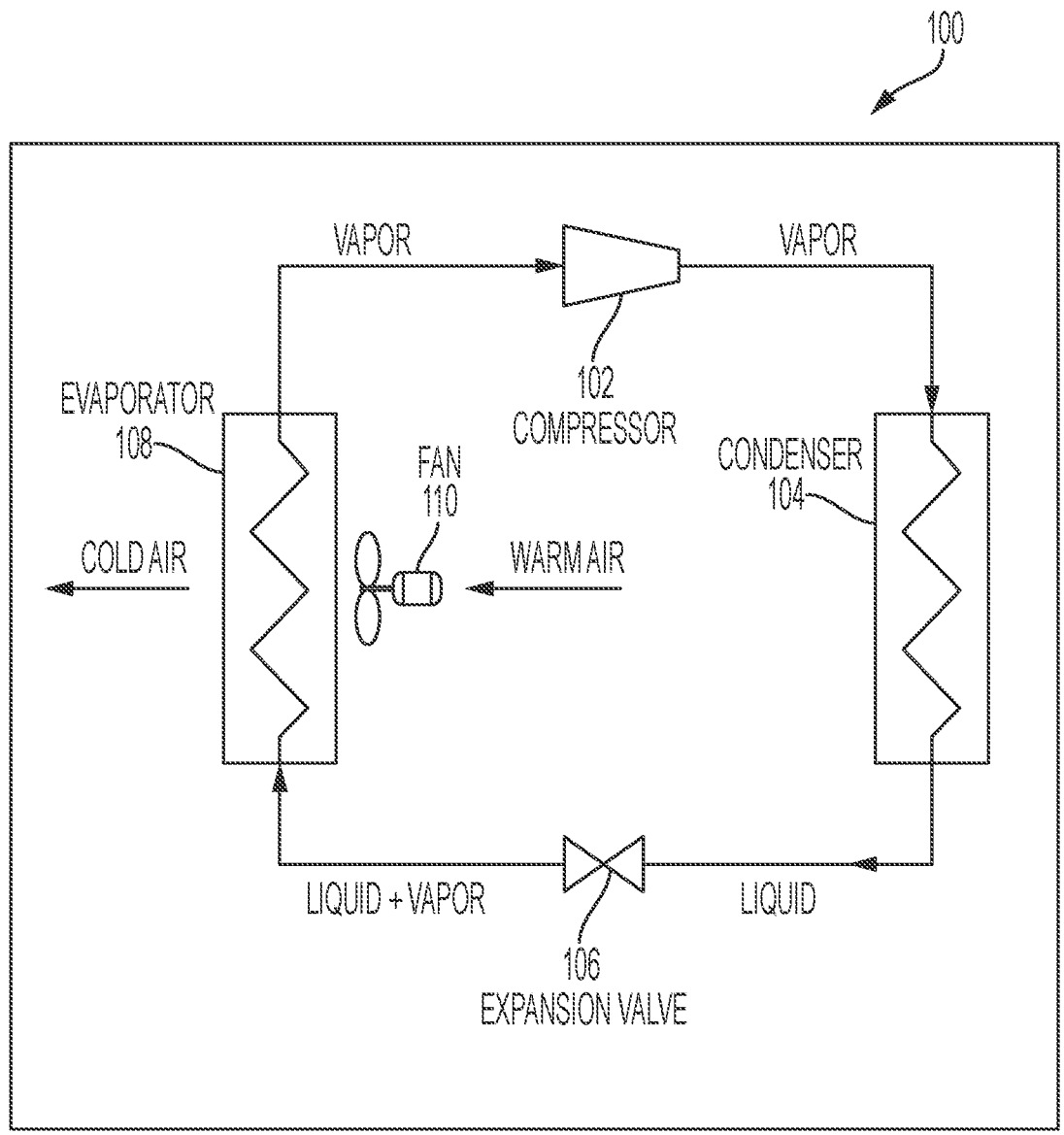
FIG. 1 is a circuit diagram of an AWG circuit, according to the prior art.
Figure 2:
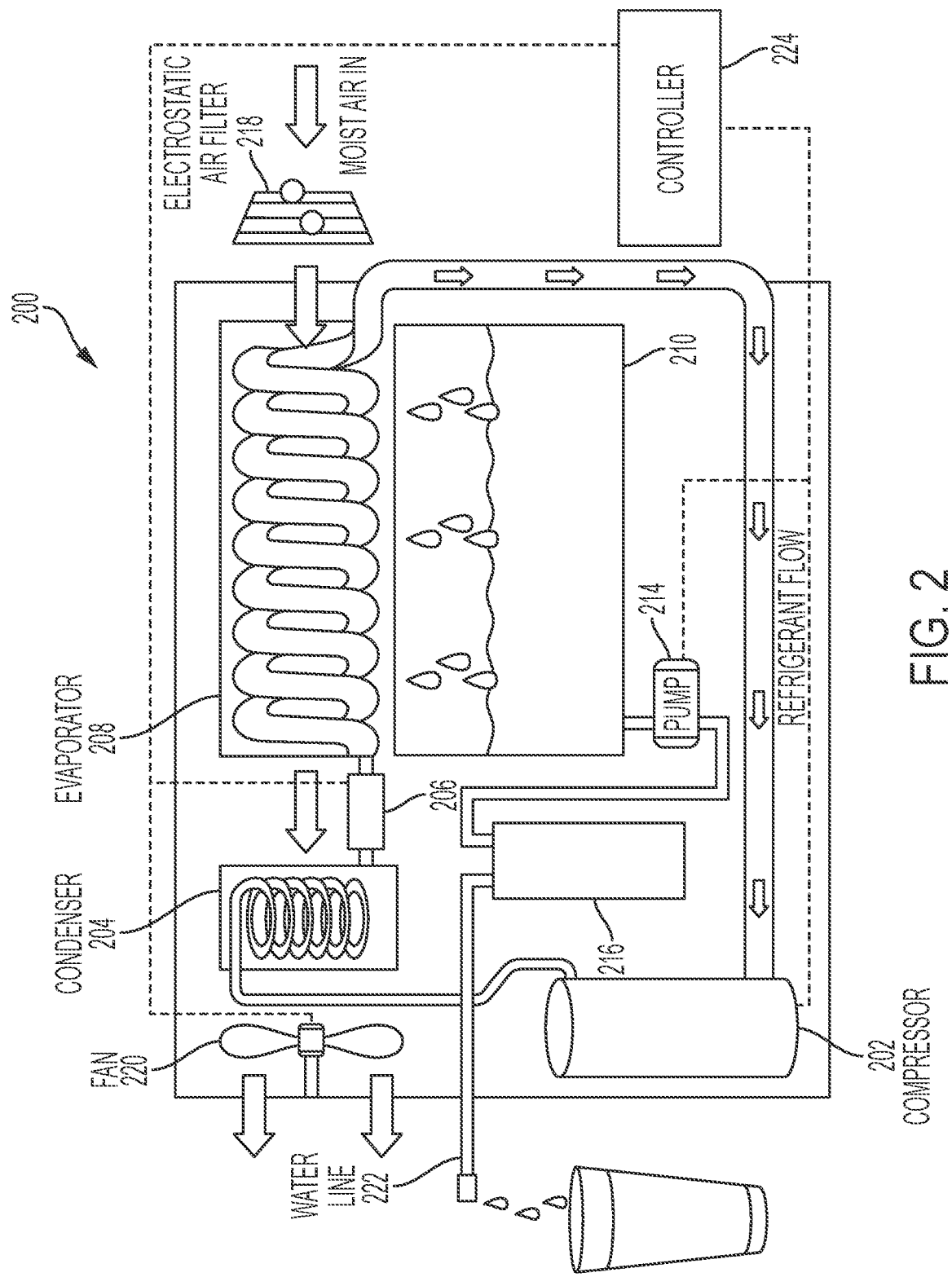
FIG. 2 is a diagram of an example AWG according to some embodiments of the disclosure.

An example atmospheric water generator 200, shown in FIG. 2, may include a first AWG refrigerant circuit having a compressor 202, a condenser 204, an expansion device 206, and an evaporator 208. The compressor 202 may be a compact screw compressor. Compact screw compressors may use meshing screws, or rotors, to create a constant, or near constant, flow and compression of gas or fluid inside the compressor. The constant flow can limit pulsation and provide a constant or near constant flow of refrigerant in the AWG 200. Compact screw compressors can provide a variety of advantages over traditional screw compressors or compressors traditionally incorporated in AWGs, such as scroll or reciprocating compressors. For example, compact screw compressors may be more efficient, lighter, more compact, and easier to maintain and assemble than traditional screw, scroll, or reciprocating compressors. Compact screw compressors may also provide a fine degree of control over coolant pressure and speed of movement in the AWG system not present in systems with scroll or reciprocating compressors. The compact screw compressor 202 may compress refrigerant, outputting the refrigerant in a superheated gaseous state.

The superheated gaseous refrigerant may be received by a condenser 204 which may condense the refrigerant into a saturated or subcooled liquid. The condenser 204 may cool the refrigerant to cause it to condense into a liquid state. The condenser 204 may be a microchannel condenser coil, passing refrigerant through small channels to enable more efficient condensation of the refrigerant.

The subcooled liquid refrigerant may be passed from the condenser 204 to an expansion device 206. The expansion device 206 may further cool the refrigerant by reducing pressure on the refrigerant. The expansion device 206 may, for example, be an expansion valve or a capillary tube. The expansion device 206 may include one or more independent acting microcontrollers to control operation of the expansion device 206 and govern the rate and pressure at which refrigerant is passed to the evaporator 208. Due to the decreased pressure, the refrigerant output from the expansion device 206 may be a mixture of liquid and vapor.

The refrigerant may be passed from the expansion device 206 to the evaporator 208. Evaporator 208 may allow heat from air adjacent to evaporator 208 to be transferred to the refrigerant inside, thereby reducing the temperature of the air. The reduction of temperature of the air may cause water to condense. The evaporator may for example be a microchannel evaporator coil. Similar to microchannel condenser coils, microchannel evaporator coils pass refrigerant through small channels to enable more efficient heat transfer from the air to the refrigerant. The heat transfer from the air to the refrigerant may cause the remaining liquid refrigerant to vaporize. The vapor refrigerant may then be passed back to compressor 202 to continue the cycle.

Water condensed by the evaporator 208 may be collected in a water collection unit 210 for accumulation and pump feed. Water collection unit 210 may, for example, be made of stainless steel. Water treatment system 216 may include a bacteria control system, particulate filtration, and mineralization to purify water pumped from water collection unit 210. When water is needed, pump 214 may operate to transfer water from water collection unit 210 through the water treatment system 216. Pump 214 may, for example, be a food-safe, run-dry, self-priming, double diaphragm, water condensate pump. Water treatment system 216 may treat water so that the water is fit for human consumption. After passing through water treatment system 216, the water may pass through water line 222 to an output of the AWG 200. The water treatment system 216 may not be included, may be internal to each AWG module, or may be external with multiple AWG modules sharing a single water treatment system 216. For example, the water line 222 may be coupled to bulk use or a water treatment skid for drinking water.

Air may be moved through the AWG 200 using fan 220. Fan 220 may be a vane-axial fan. Although a single fan is shown, multiple fans may be used to move air through the AWG 200. For example, the fan 220 may move warm moist air into the unit through electrostatic air filter 218. The warm, moist air may then be channeled around evaporator 208 which may cool the air, causing moisture in the air to be condensed into water collection unit 210. Fan 220 may then move the cool dry air around the condenser, where the air may absorb heat from the refrigerant in the condenser, causing the refrigerant to condense more efficiently. The warmed air may then be expelled from the AWG 200 by fan 220. Airflow in the AWG 200 may be designed, using vane-axial fan 220, to produce partial airflow through a controlled portion of the AWG 200 around the evaporator 208 with a bypass stream allowing partial airflow bypassing the evaporator 208. The two partial streams may combine for full airflow cooling condenser 204 and expulsion from the AWG 200. The use of a bypass airstream can help to minimize water entrainment in air that is expelled from the AWG by the fan 220.

Motors of the AWG 200 may be controlled by controller 224. Controller 224 may include a variable frequency drive (VFD) or a plurality of VFDs. Controller 224 may control fan 220, expansion device 206, pump 214, and compact screw compressor 202. The use of variable frequency drives by controller 224 to drive components may allow the compressor 202, fan 220, and pump 214 to run continuously and ramp up/down in speed when started or stopped. Variable frequency drives can thus smooth power consumption and reduce overall peak power demand.

Variable frequency drives can also be manually adjusted to optimize motor speed for each component of the AWG 200. Controller 224 may include a programmable logic controller (PLC). The PLC may include a color touchscreen interface for programming operational sequencing of the AWG 200 including ramping functions for the motor drives, such as variable frequency drives, pumpdown sequences, and maintenance and tuning modes for the AWG 200. Controller 224 may monitor a variety of process variables of the AWG 200, such as coil face temperatures in the condenser 204 and evaporator 208. If controller 224 detects operation outside of predetermined operating ranges, such as predetermined temperature ranges, it may take action to safeguard equipment and personnel, such as by shutting down the AWG 200. Controller 224 may also connect to the internet to allow remote access and telemetry of the AWG 200 and to provide notifications regarding system status and maintenance. The controller 224 may also control a plurality of step-motor electric expansion valves (not shown) to control the flow of refrigerant in the system. For example, through the step-motor electric expansion valves, the controller 224 may control main operation of the AWG refrigerant circuit while allowing manual adjustment of the operation of speeds of the fan 220, compressor 202, and pump 214 to tune the system during startup or to trim control during operation. In some embodiments, fan 220 may be driven by a direct drive motor with speed control.

In some embodiments, two or more AWG refrigerant circuits may be coupled in parallel to increase water output. For example, an AWG circuit similar or identical to the AWG refrigerant circuit of FIG. 2 including condenser 204, expansion device 206, evaporator 208, and compact screw compressor 202 may be coupled in parallel to the AWG circuit of FIG. 2. The two circuits may share fans 220, air filters 218, a single water collection unit 210, a pump 214, water treatment system 212, and a controller 224, or each system may have its own water collection and treatment, air movement, and control components. Multiple AWG refrigerant circuits, such as the AWG refrigerant circuit shown in FIG. 2, may be included in a single AWG module. Two parallel AWG modules can produce water output up to and exceeding 20,000 gallons per day.

Figure 3:
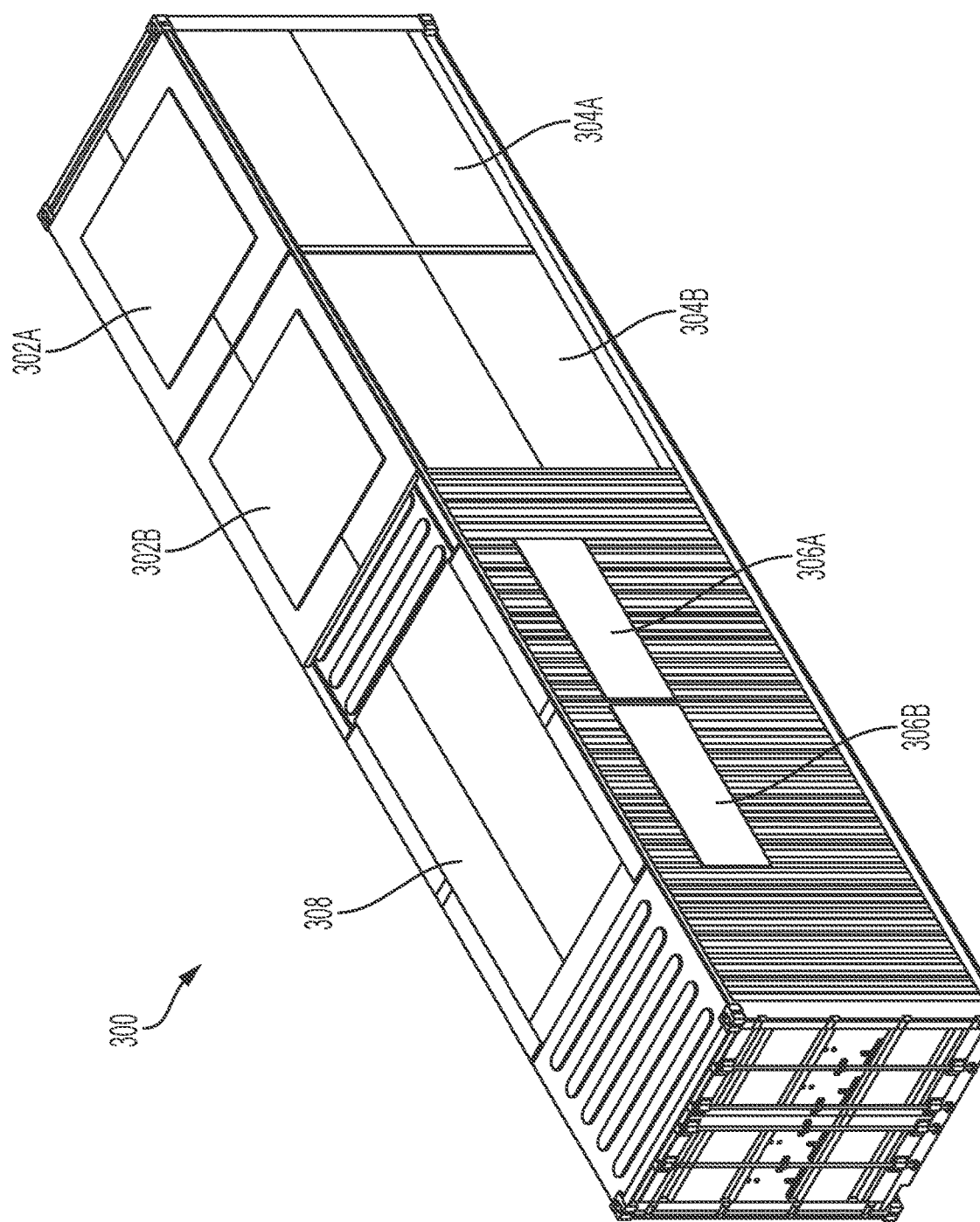
FIG. 3 is a perspective view of a modular AWG dissembled for shipping according to some embodiments of the disclosure.

An AWG may be packaged as a AWG module for easy shipping and installation. An example AWG module 300 is shown in FIG. 3. As shown in FIG. 3, the AWG module 300 is packaged for easy shipping in a rectangular form factor. Protective plates 302A-B may cover attachment openings for one or more external fans, such as vane-axial fans. Protective plates 304A-B, 306A-B, and 308 may cover air intake and output openings and/or filters. The AWG module 300 may ship with refrigerant precharged to simplify installation. The enclosure may, for example, be produced with climate control to operate in both hot and cold climates. When the AWG module 300 is delivered, plates 302A-B 304A-B, 306A-B, and 308 may be removed.

Figure 4:
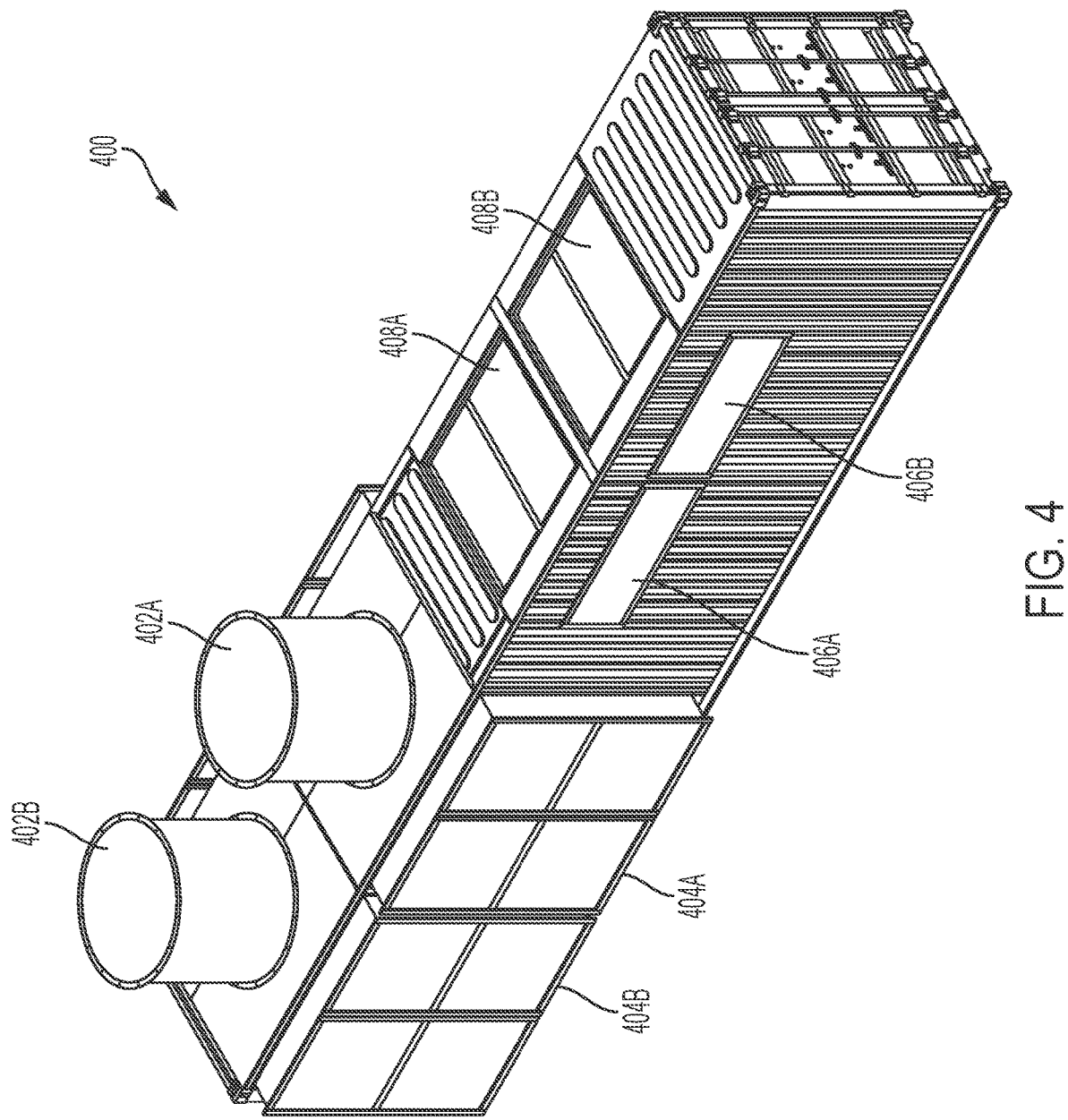
FIG. 4 is a perspective view of an assembled modular AWG according to some embodiments of the disclosure.

The AWG module may be assembled at the operation site. An example assembled AWG module 400 is shown in FIG. 4. When an AWG module, such as AWG module 300 of FIG. 3, is delivered, the AWG may be quickly assembled by bolting fans 402A-B, which may be vane-axial fans, to the top of AWG 400, and adding filter media holders, screens, and/or filters to air intakes 404A-B and 406A-B. Fans 402A-B, which may be shipped separately, may be attached to the top of AWG module 400, where plates 302A-B had previously been attached. Fans 402A-B may be driven using direct drive motors with speed control. Air intakes 404A-B may allow air to be pulled into the AWG module 400 by fans 402A-B for moisture extraction. Air intakes 404A-B may include air filters such as antimicrobial MERV9 rated filters. Air intakes 406A-B may also allow air intake into the AWG 400. Air intakes 406A-B may also include air filters such as antimicrobial MERV9 rated filters. Fans inside outputs 408A-B may pull air in through intakes 406A-B and expel air through outputs 408A-B. Filters for air intakes 404A-B and 406A-B may ship separately from the AWG 300 shown in FIG. 3. Airflow from intakes 404A-B to fans 402A-B may be isolated from airflow from intakes 406A-B to outputs 408A-B. For example airflow from intakes 404A-B to fans 402A-B may supply air to an AWG for moisture extraction, while airflow from intakes 406A-B to outputs 408A-B may cool a subcooling system of the AWG module 400.

Figure 5:
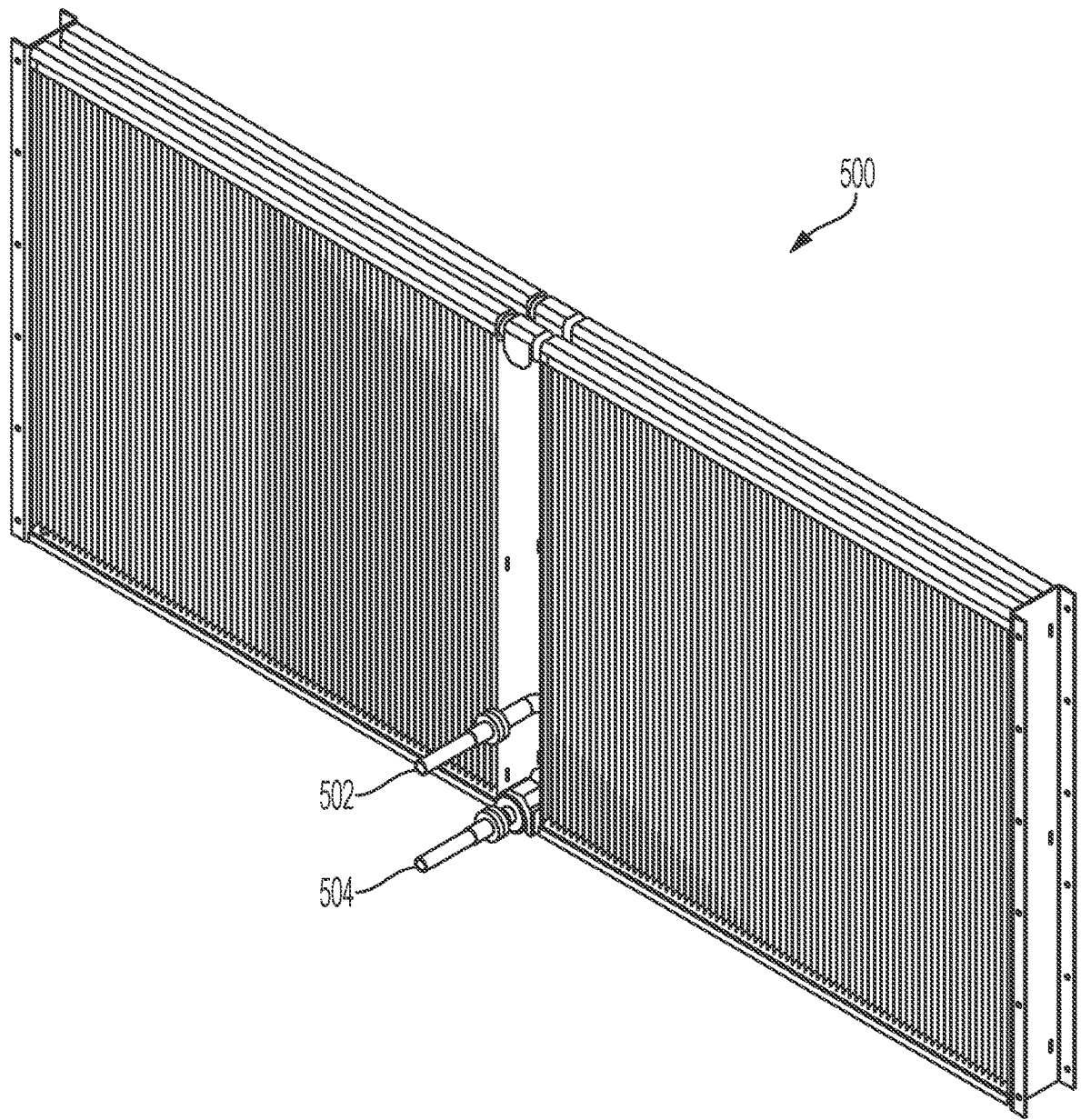
FIG. 5 is a perspective view of a microchannel condenser coil according to some embodiments of the disclosure.

Microchannel condenser coils can enhance the efficiency and water production of an AWG. An example two-row series-flow microchannel condenser coil 500 is shown in FIG. 5. The microchannel condenser coil 500 may receive super-heated vapor refrigerant via an intake 502, and pass the refrigerant through multiple small channels on the right and the left. The condenser 500 may cool the refrigerant through transferring heat from the refrigerant to air around the condenser 500. The small size of the channels can enhance the operation of the condenser allowing more rapid and efficient heat transfer between the refrigerant and the air. The cooling of the refrigerant may cause the vapor refrigerant to condense so that a cooled liquid refrigerant is output from the condenser 500 via output 504. The microchannel condenser coil 500 may consist of multiple manifolded braised modules. Multiple condenser coils may be included in an AWG system, such as AWG 200 shown in FIG. 2.

Figure 6:
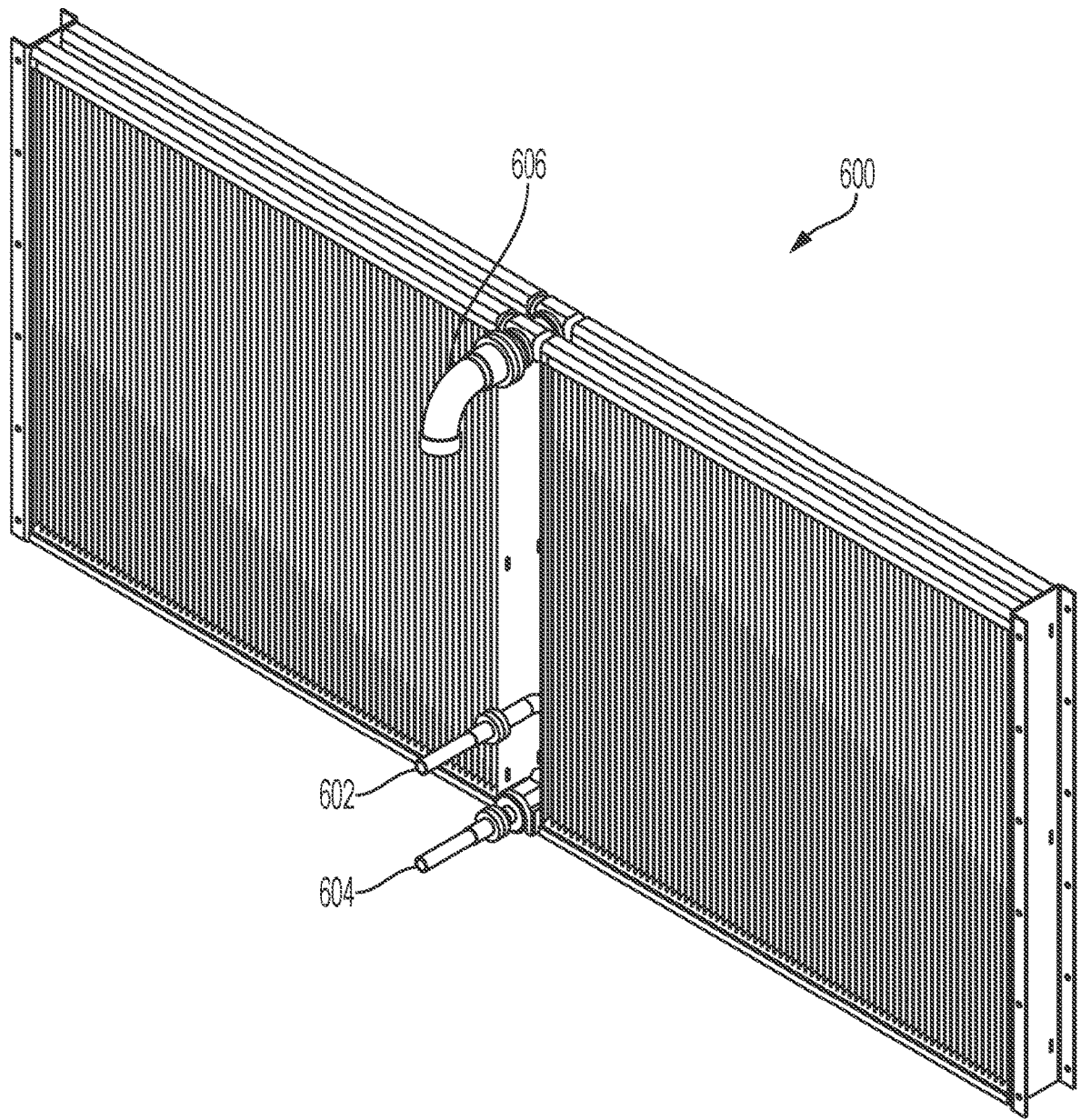
FIG. 6 is a perspective view of a microchannel evaporator coil according to some embodiments of the disclosure.

Microchannel evaporator coils can also enhance the efficiency and water production of an AWG. An example two-row parallel-fed microchannel evaporator coil 600 is shown in FIG. 6. The microchannel evaporator coil 600 may receive cooled liquid/vapor mix refrigerant at inlets 602, 604 and may pass the refrigerant through multiple small channels on the right and the left. The small size of the channels can enhance the operation of the evaporator allowing more rapid and efficient heat transfer between the refrigerant and the air and thus more efficient water extraction. As it passes through the channels, the refrigerant may absorb heat from ambient air, causing water to condense and be collected by the microchannel evaporator coil 600. The microchannel evaporator coil 600 may output warmed liquid refrigerant at outlet 606 and collected water from its fins, which gravity may drain to a water collection unit located below the microchannel evaporator coil 600. The microchannel evaporator coil 600 may consist of multiple manifolded brazed modules. Multiple evaporator coils may be included in an AWG system, such as AWG 200 shown in FIG. 2.

Figure 7:
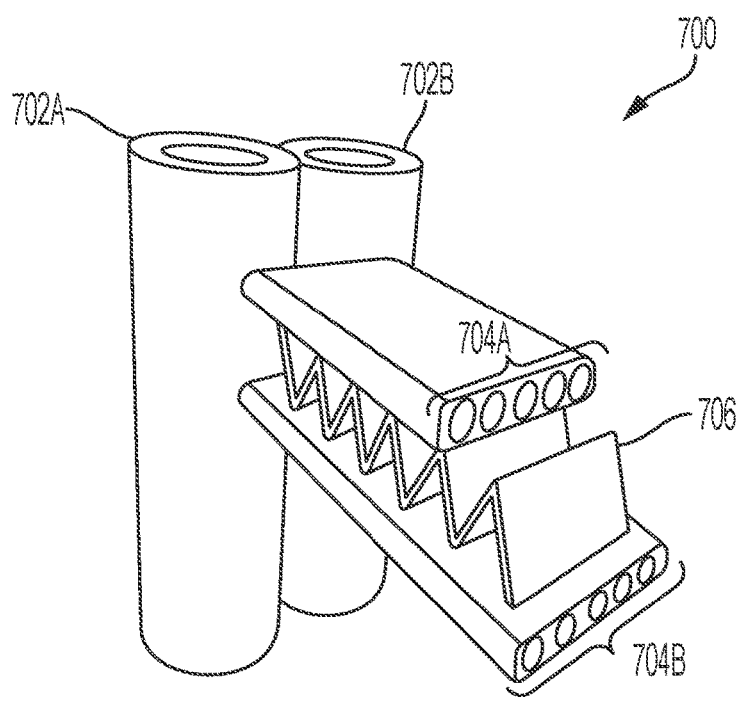
FIG. 7 is perspective view of a portion of a microchannel coil according to some embodiments of the disclosure.

An example perspective view 700 of a microchannel coil is shown in FIG. 7. Headers 702A-B may conduct refrigerant to and away from the microchannels 704A-B. The microchannels may conduct refrigerant along integrally brazed fin 706 to facilitate heat transfer between refrigerant and the ambient air. Integrally brazed fin 706 may allow air flow along microchannels 704A-B and facilitate condensation of water from the air, in microchannel evaporators. Thus, a microchannel evaporator or condenser coil may facilitate more efficient heat transfer between refrigerant and ambient air.

Figure 8:
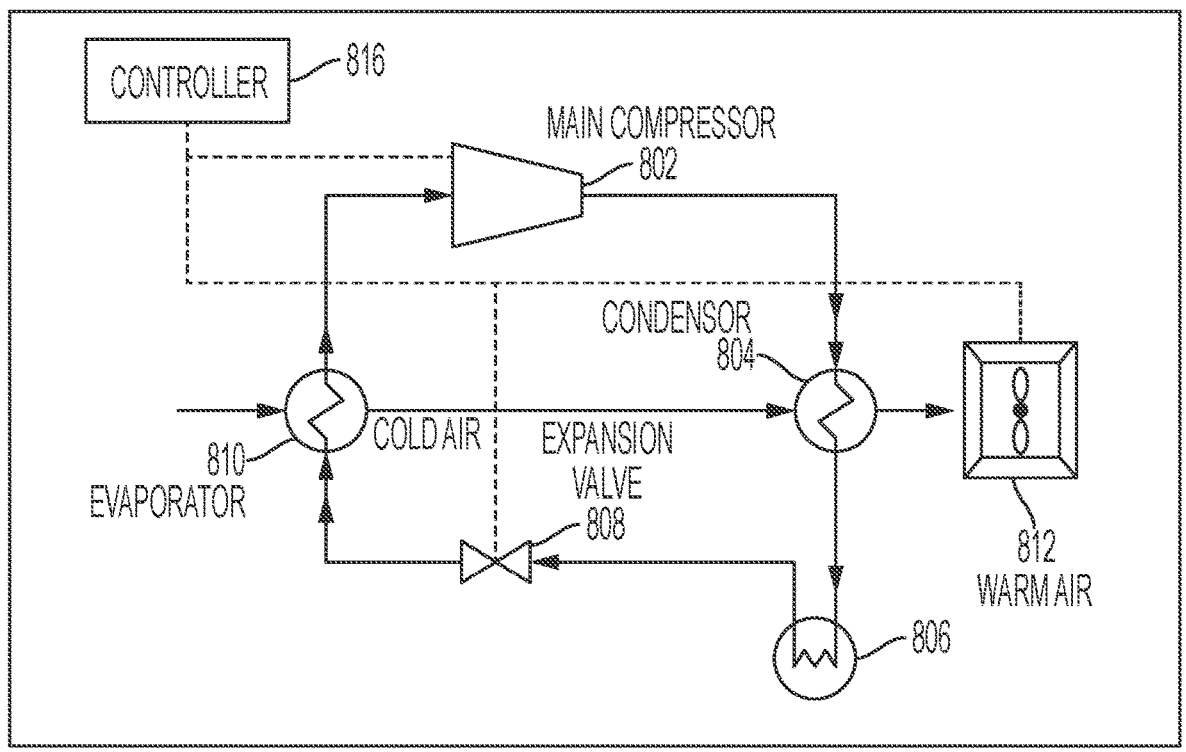
FIG. 8 is a circuit diagram of an AWG circuit having a subcooler according to some embodiments of the disclosure.

A subcooling system may be used to further cool refrigerant of an AWG system, such as the AWG shown in FIG. 2, and may improve the efficiency and output of the AWG system. For example, in AWG systems incorporating microchannel evaporator and condenser coils, it may be necessary to reduce refrigerant velocities to maintain efficient operation. Use of a subcooling system to further cool refrigerant can allow the necessary velocity reduction while maintaining a desired temperature of the refrigerant when entering an evaporator. An example AWG 800 including a subcooling circuit heat exchanger 806 is shown in FIG. 8. The refrigerant circuit of AWG 800 may include a compressor 802, a condenser 804, a subcooling heat exchanger 806, an expansion valve 808, and an evaporator 810. A compressor 802, such as a compact screw compressor, may compress refrigerant and output vapor refrigerant to a condenser 804, such as a microchannel heat exchange coil condenser. The condenser 804 may cool and condense the refrigerant with air flow provided by fan(s) 812. The condenser 804 may output liquid condensed refrigerant to a subcooling system heat exchanger 806. The liquid refrigerant output by the condenser may, in some embodiments, be at a temperature higher than the ambient temperature. The subcooling circuit heat exchanger 806 may further cool the refrigerant and may bring the temperature of the liquid refrigerant down to well below ambient temperature. The subcooling circuit 806 may output the refrigerant to an expansion valve 808 to further cool the refrigerant and transform it to a liquid and vapor mixture. The liquid and vapor mixture may be output by an expansion valve 808 to an evaporator 810, such as a microchannel heat exchange coil evaporator, to extract moisture from air moved across the evaporator 810 by fan(s) 812. The evaporator 810 may then output refrigerant to the compressor 802. Controller 816 may control the operation of compressor 802, expansion valve 808, and fan(s) 812.

Figure 9:
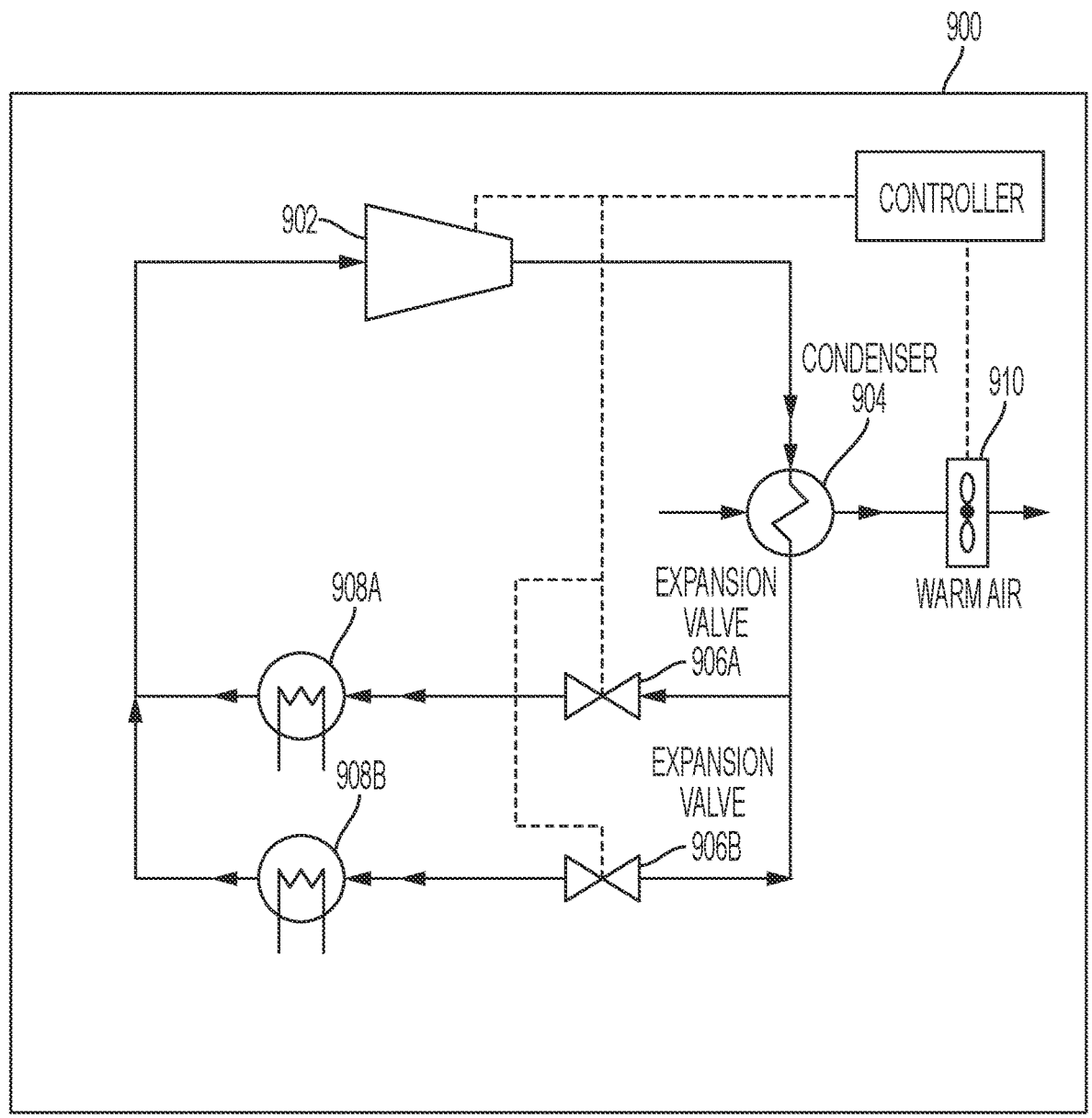
FIG. 9 is a circuit diagram of a subcooler circuit cooling two parallel AWG circuits according to some embodiments of the disclosure.

An example subcooling system 900 is shown in FIG. 9. The subcooling system 900 may include a refrigerant circuit that is separate from the refrigerant circuit of the AWG 800. A compressor 902, such as a compact screw compressor may compress refrigerant and may output superheated vapor refrigerant to a condenser 904, such as a microchannel heat exchange coil condenser. Condenser 904 may condense the refrigerant to a liquid form, allowing heat to transfer from the refrigerant to air flow supplied by fan 910. Condenser 904 may output liquid refrigerant to an expansion valve 906A which may reduce pressure on the refrigerant, further cooling the refrigerant and transitioning the refrigerant to a liquid and vapor mixture. The refrigerant may then absorb heat from the AWG refrigerant circuit 908A. For example, the refrigerant of the subcooling system 900 may absorb heat from the refrigerant of the AWG circuit via heat exchanger 908A, for example as in AWG 200 of FIG. 2 or AWG 800 of FIG. 8. The refrigerant may then be passed to the compressor 902 to continue the cycle. In some embodiments, multiple subcooling paths including expansion valves 906A-B may be used to cool the AWG via heat exchangers 908A-B. In other embodiments, the multiple subcooling paths may cool multiple AWG refrigerant circuits via heat exchangers 908A-B. Thus, an AWG may, in some embodiments, have three or more refrigerant circuits: two or more AWG refrigerant circuits and a subcooling circuit to cool the two or more AWG refrigerant circuits.

Figure 10:
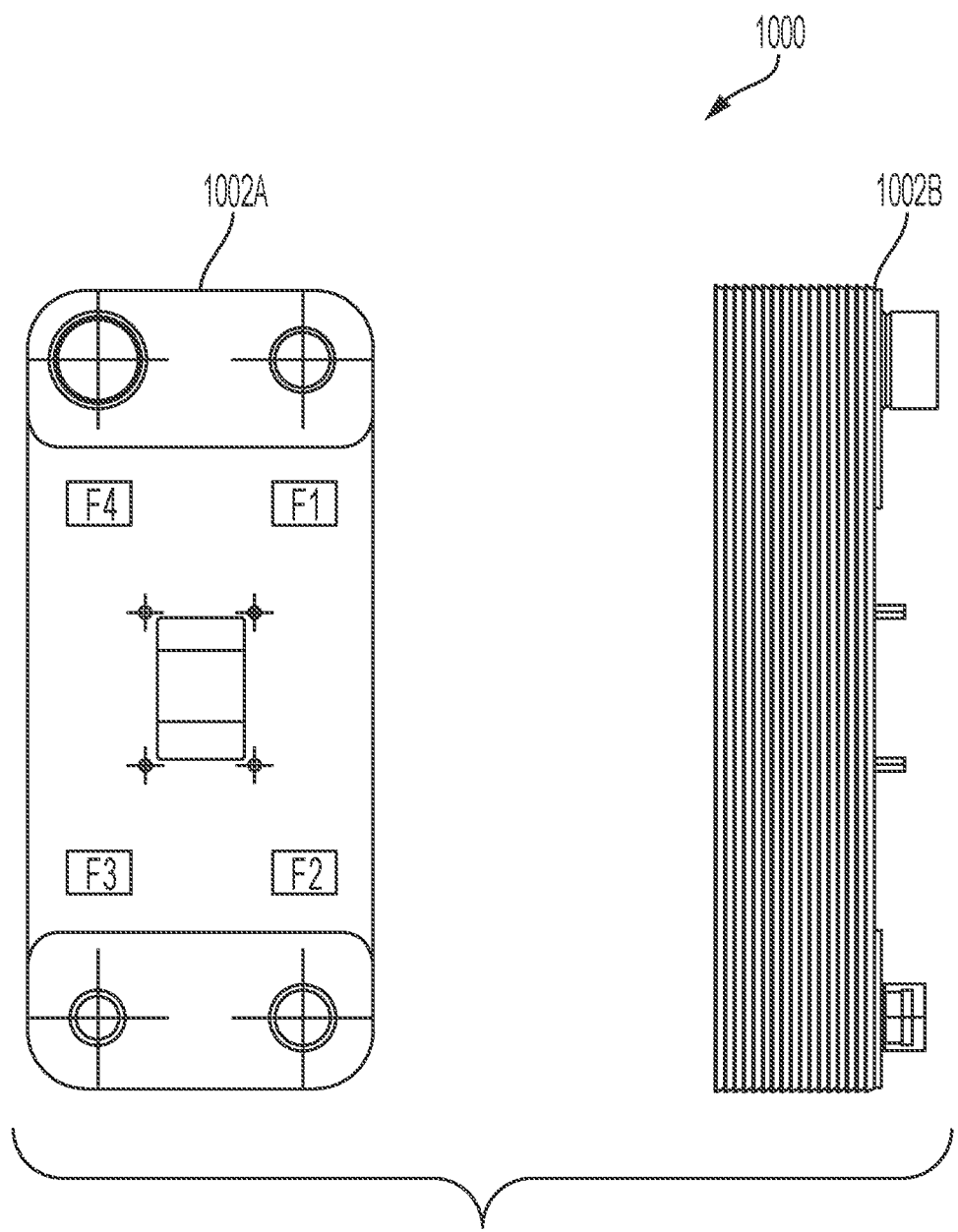
FIG. 10 is a perspective view of a subcooling plate heat exchanger according to some embodiments of the disclosure.

A subcooling system may include one or more subcooling plate heat exchanges to facilitate exchange of heat between refrigerant of an AWG refrigerant circuit and refrigerant of the subcooling system. An example plate heat exchanger 1000 is shown in FIG. 10. A front view 1002A of the plate heat exchanger 1000 is shown, in addition to a side view 1002B of the plate heat exchanger 1000. The plate heat exchanger 1000 may, for example, act as an evaporator transferring heat from refrigerant of one or more AWG refrigerant circuits to refrigerant of the subcooling circuit. Plate heat exchangers may provide direct refrigerant-to-refrigerant efficient heat transfer in a compact design with low refrigerant pressure drops to increase the efficiency of the system.

Figure 11:
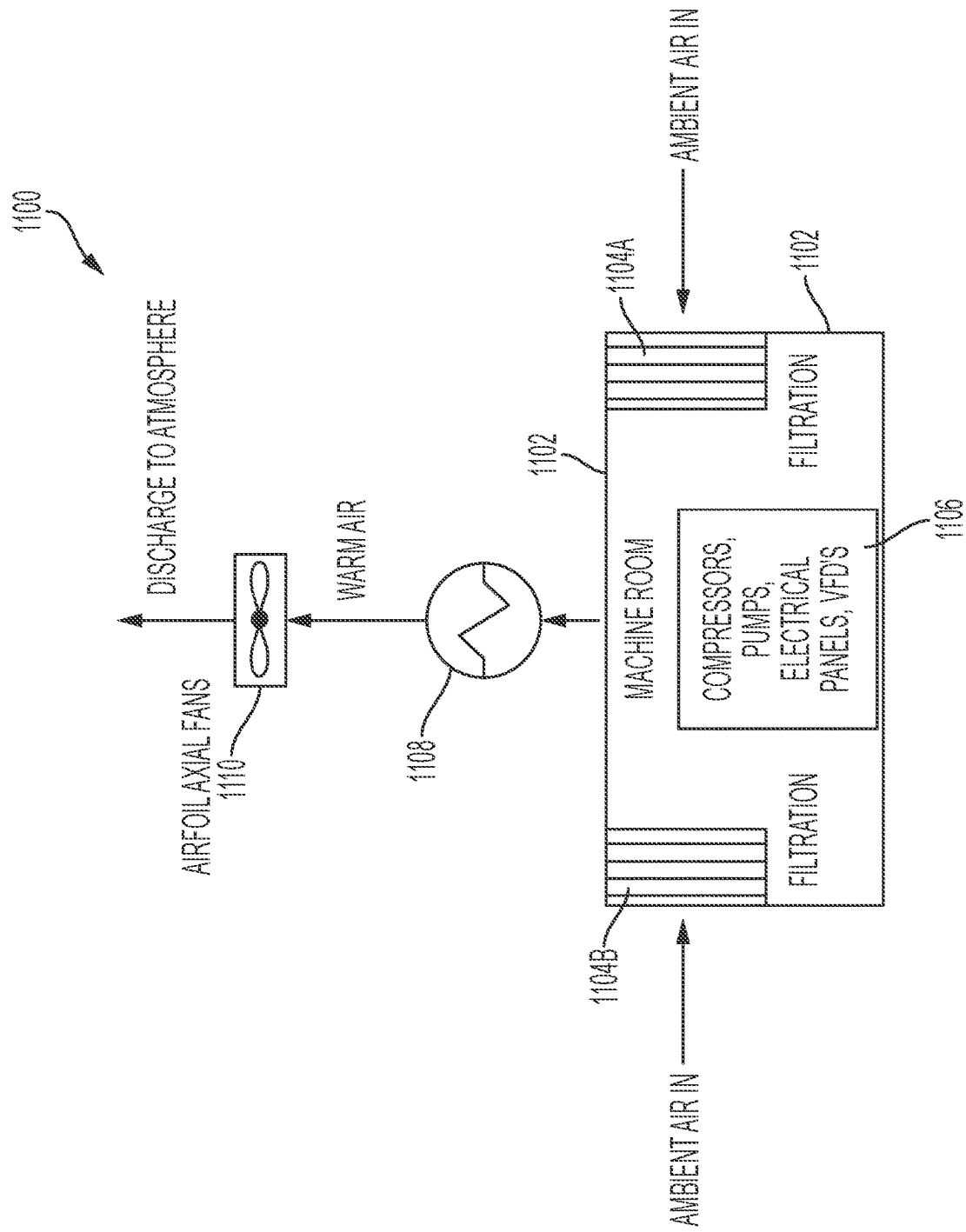
FIG. 11 is a block diagram of a heat rejection unit according to some embodiments of the disclosure.
Figure 12:
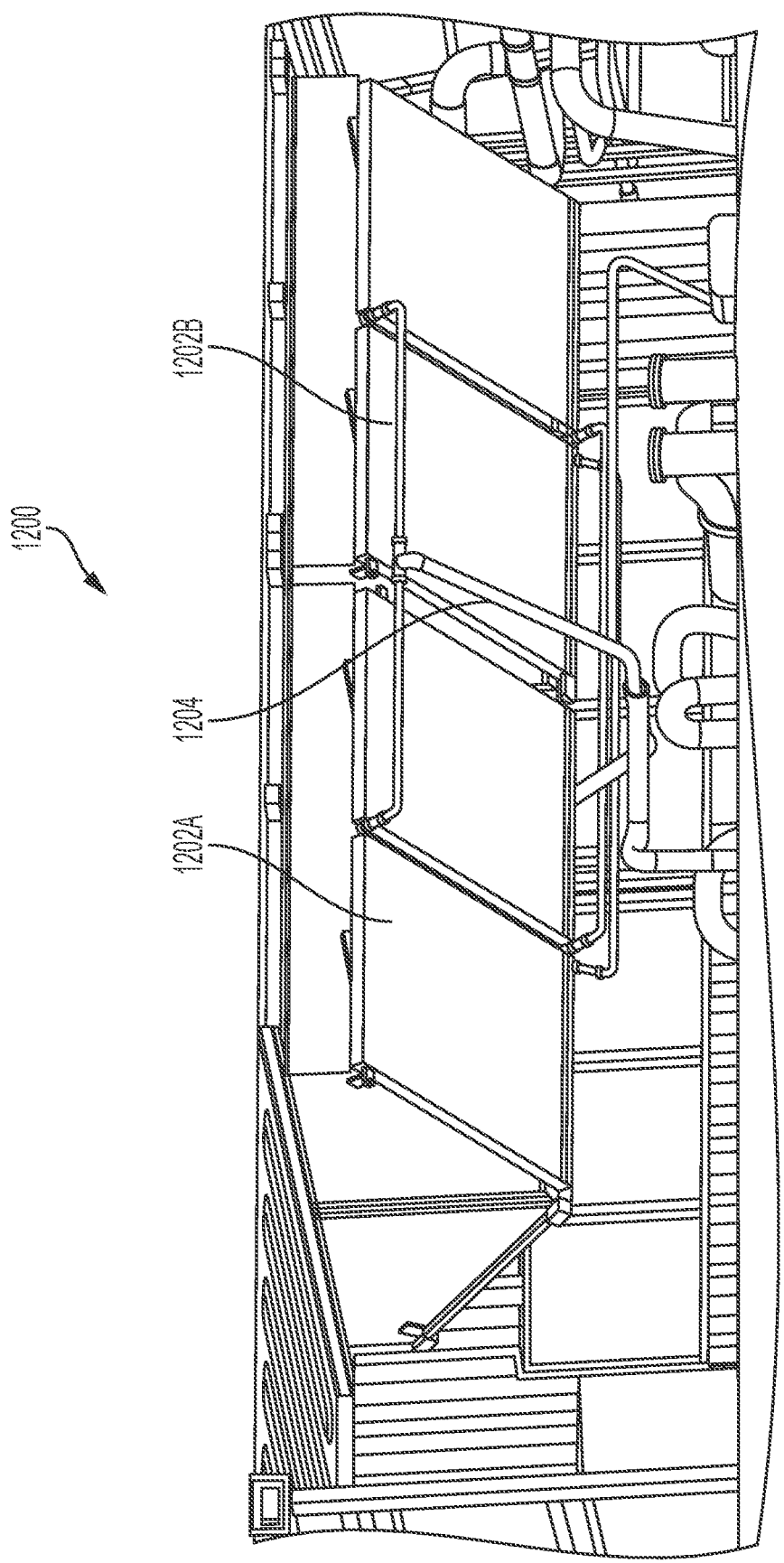
FIG. 12 is a perspective view of a plurality of condensers of a subcooler according to some embodiments of the disclosure.

An AWG may also include a heat rejection unit (HRU) to cool the subcooling system. For example, the HRU may include one or more microchannel coil condensers for condensing refrigerant and passing the heat from the refrigerant to ambient air. The air flow through the HRU may be isolated from the air flow of an AWG refrigerant circuit. An example HRU 1100 is shown in FIG. 11. The HRU 1100 may include a machine room 1102 housing components 1106 of the subcooling system, such as compressors, pumps, electrical panels, and variable frequency drives. Air may enter the machine room 1102 through filters 1104A-B. For example, filters 1104A-B may include flow matched filtered suction panels to prevent contaminants in external air from entering the machine room 1102. A subcooling system 1108 including microchannel coil condensers, which may be located in the machine room 1102 or external to the machine room 1102, may be cooled using the HRU 1100. The HRU may use airfoil axial fans 1110 to pull air through the filters 1104A-B and across the microchannel coil condensers of the subcooling system 1108 to further cool refrigerant of the subcooling system 1108. The airfoil axial fans 1110 may be driven by one or more variable frequency drives. Thus, the HRU 1110 may provide additional cooling airflow to the subcooling system isolated from airflow of the AWG refrigerant circuit, and an evaporator of the AWG refrigerant circuit in particular. Separation of the HRU airflow from the airflow of the AWG refrigerant circuit may increase efficiency and water production of the AWG and may also allow water production at higher ambient temperatures, due to pre-cooling of liquid refrigerant in the AWG refrigerant circuit. An example perspective view of the HRU 1200 is shown in FIG. 12.

Figure 13:
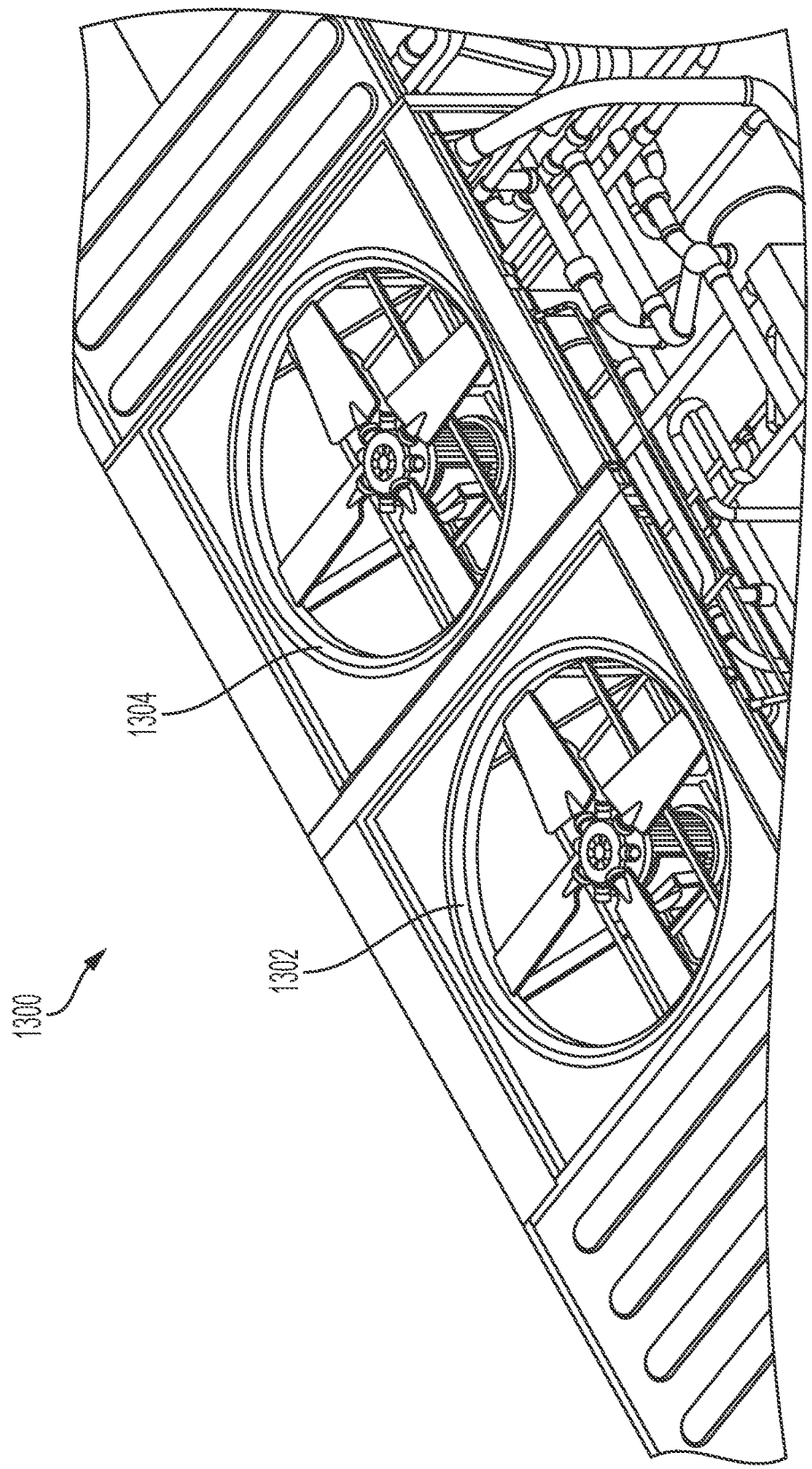
FIG. 13 is a perspective view of a plurality of airfoil axial fans of a subcooler according to some embodiments of the disclosure.

The HRU 1200 may include multiple condensers 1202A-B coupled to cool refrigerant from refrigerant line 1204. Airfoil axial fans 1302, 1304, illustrated in the top-down view of an example HRU 1300 in FIG. 13, may pull air up, through the condensers 1202A-B and expel air from the HRU 1200 of FIGS. 12 and 1300 of FIG. 13. Thus, the HRU may provide additional cooling to the subcooling system.

Figure 14:
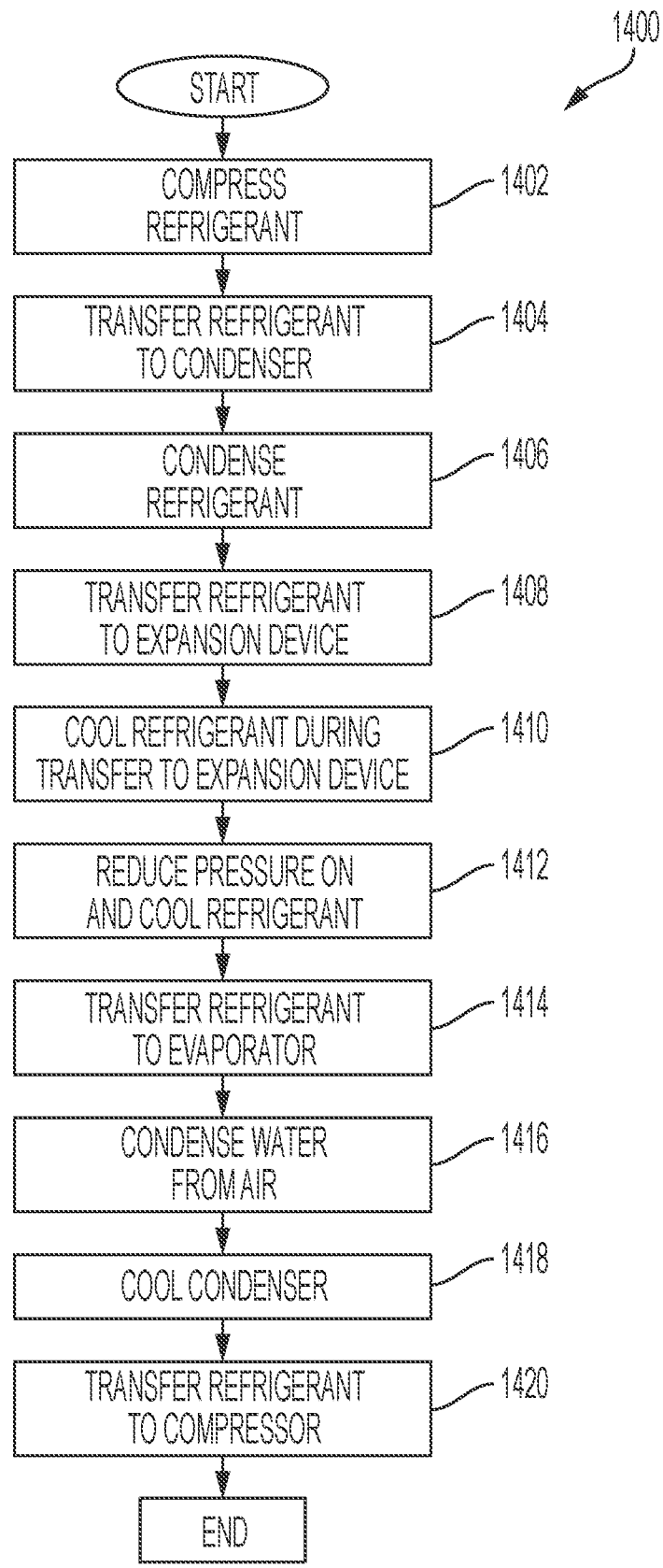
FIG. 14 is an example method of extracting water from air according to some embodiments of the disclosure.

An example method 1400 of extracting water from ambient air using an AWG is shown in FIG. 14. The method 1400 may begin, at step 1402, with compressing refrigerant. For example, refrigerant may be compressed using a compact screw compressor. At step 1404, the refrigerant may be transferred from the compressor to a condenser. The condenser may, for example, include a microchannel condenser coil. At step 1406, the condenser may condense refrigerant. Condensing the refrigerant may include cooling the refrigerant. At step 1408, the refrigerant may be transferred from a condenser to an evaporator. At step 1410, the refrigerant may be transferred to an expansion device. At step 1412, while the refrigerant is being transferred from the condenser to the expansion device, the refrigerant may be cooled further. For example, the refrigerant may be cooled by a subcooling system. At step 1412, the expansion device may reduce pressure on and further cool the refrigerant. At step 1414, the refrigerant may be transferred from the expansion device to the evaporator. At step 1416, water may be condensed from ambient air by the evaporator. The evaporator may, for example, include a microchannel evaporator coil to facilitate heat exchange between refrigerant and ambient air to cool the ambient air causing condensation to form. At step 1418, the condenser may be cooled. For example, one or more fans, such as vane-axial fans, may be used to draw air across the evaporator, to cool the air and extract water from the air, and across the condenser, to cool refrigerant inside the condenser causing it to condense. At step 1420, the refrigerant may be transferred from the evaporator to the compressor. In some embodiments, the method 1400 may repeat indefinitely, until a controller or manual input deactivates the AWG.

The schematic flow chart diagram of FIG. 14 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus, comprising: a first atmospheric water generation circuit comprising: a first condenser configured to condense refrigerant to a liquid state, the first condenser comprising microchannel coils; a first expansion device having an inlet coupled to an outlet of the first condenser and configured to reduce refrigerant pressure and temperature; a first evaporator having an inlet coupled to an outlet of the first expansion device and configured to condense water from air adjacent to the first evaporator by transferring heat from the air to the refrigerant, the first evaporator comprising microchannel coils; a container configured to collect the water condensed by the first evaporator; a first compact screw compressor having an inlet coupled to an outlet of the first evaporator and an outlet coupled to an inlet of the first condenser configured to compress the refrigerant; a first fan for moving the air though the apparatus; a water treatment system coupled to an output of the container to treat water from the container; a pump for pumping water from the container and through the water treatment system; a water line for passaging water from the water treatment system to an output of the apparatus; a subcooling system coupled between the outlet of the first condenser and the inlet of the first expansion device configured to absorb heat from refrigerant flowing from the first condenser to the first expansion device, wherein the subcooling system comprises a refrigerant circuit separate from the refrigerant circuit of the first atmospheric water generation circuit; and a controller, operable for controlling the first fan, the first evaporator, the first compact screw compressor, and the pump of the first atmospheric water generation circuit and controlling the subcooling system, for producing treated water from the air.

2. The apparatus of claim 1, wherein the first fan comprises a vane-axial fan configured to removed dry air from an area adjacent to the first evaporator and configured to replace the dry air with moist air.

3. The apparatus of claim 2, wherein the vane-axial fan is further configured to cool the condenser.

4. The apparatus of claim 1, wherein the subcooling system comprises a direct expansion plate heat exchanger configured to transfer heat directly between refrigerant flowing from the first condenser to the first expansion device and refrigerant flowing through the subcooling system.

5. The apparatus of claim 1, wherein the subcooling system comprises a heat rejection unit to cool the subcooling system.

6. The apparatus of claim 5, wherein the heat rejection unit comprises an airfoil axial fan.

7. The apparatus of claim 6, wherein airflow of the subcooling system produced by the airfoil axial fan is isolated from the first evaporator.

8. The apparatus of claim 1, further comprising a variable frequency drive (VFD) configured to control one or more motors of the system.

9. The apparatus of claim 1, wherein the water treatment system is coupled to the output of the container to treat water from the container for microbial, particulate, and dissolved mineral content.

10. The apparatus of claim 9, wherein the pump comprises a double diaphragm water condensate pump to pump water from the container through the water treatment system.

11. The apparatus of claim 1, further comprising:
a second atmospheric water generation circuit comprising:
 a second condenser configured to condense refrigerant to a liquid state;
 a second expansion device having an inlet coupled to an outlet of the second condenser and configured to reduce refrigerant pressure and temperature;
 a second evaporator having an inlet coupled to an outlet of the second expansion device and configured to condense water from air adjacent to the second evaporator by transferring heat from the air to the refrigerant; and
 a second compact screw compressor having an inlet coupled to an outlet of the second evaporator and an outlet coupled to an inlet of the second condenser configured to compress the refrigerant,
 wherein the container collects water from both the first evaporator and the second evaporator.

12. The apparatus of claim 11, wherein:
the subcooling circuit is operable to cool the first and the second atmospheric water generation circuit.

13. The apparatus of claim 1, wherein the apparatus further comprises a second expansion device and a second evaporator, wherein the first and second evaporators are coupled in parallel with the first compact screw compressor.

14. The apparatus of claim 1, wherein the compact screw compressor does not require any of an external motor, oil filter, oil reservoir, and oil cooling system to operate.

15. The apparatus of claim 1, wherein the first condenser, first evaporator, first, expansion valve, and first compact screw compressor are each configured to be operationally positioned within a standard shipping container.

16. The apparatus of claim 15, wherein the apparatus is configured to condense water from air following the coupling of one or more fans onto the standard shipping container.

17. The apparatus of claim 1, wherein: the subcooling system comprises a subcooling compressor, a subcooling condenser, a subcooling heat exchanger, a subcooling expansion valve, and a subcooling evaporator; and the controller is operable to control operation of the subcooling compressor, the subcooling condenser, the subcooling expansion valve, and the subcooling evaporator of the subcooling system.

18. The apparatus of claim 1, wherein the controller is operable to control operation of the first expansion device and govern the rate and pressure at which refrigerant is passed to the first evaporator, the first pump, and the first compact screw compressor.

19. The apparatus of claim 1, wherein the apparatus comprises a water production capacity up to or exceeding approximately 10,000 gallons per day.

20. A method for condensing water comprising: compressing refrigerant using a first compact screw compressor; transferring the refrigerant from the first compact screw compressor to a first condenser having microchannel coils; condensing the refrigerant to a liquid state, using the first condenser; transferring the refrigerant from the first condenser to a first expansion device; reducing refrigerant pressure and temperature, using the first expansion device;
 transferring the refrigerant from the first expansion device to a first evaporator having microchannel coils; condensing water from air adjacent to the first evaporator, using the first evaporator, by transferring heat from the air to the refrigerant; and collecting the condensed water in a container; operating a pump to transfer the collected water through a water treatment system: transferring the refrigerant from the first evaporator to the first compact screw compressor, wherein transferring the refrigerant from the first condenser to the first expansion device comprises absorbing heat from the refrigerant transferred from the first condenser to the first expansion device using a refrigerant circuit of a subcooling heat exchange system; wherein the refrigerant circuit of the subcooling heat exchange system is separate from the refrigerant circuit that transfers refrigerant from the outlet of the first condenser to the inlet of the first expansion device; and controlling with a controller, a first fan, the first evaporator, the first compact screw compressor, the pump, and the subcooling system for producing the treated water from the air.

21. The method of claim 20, further comprising removing dry air from an area adjacent to the first evaporator and replacing the dry air with moist air using a vane-axial fan.

22. The method of claim 20, further comprising: cooling the sub cooling system using a heat rejection unit of the subcooling system.

23. The method of claim 20, further comprising controlling the first compact screw compressor using a variable frequency drive.

24. The method of claim 20, wherein:
the operating the pump comprises transferring the collected water through the water treatment system to sterilize, filter, and mineralize the collected water.

25. The method of claim 24, further comprising:
compressing refrigerant using a second compact screw compressor;
transferring the refrigerant from the second compact screw compressor to a second condenser;
condensing refrigerant to a liquid state, using the second condenser;
transferring the refrigerant from the second condenser to a second expansion device; reducing refrigerant pressure and temperature, using the second expansion device;
transferring the refrigerant from the second expansion device to a second evaporator condensing water from air adjacent to the second evaporator, using the second evaporator, by transferring heat from the air to the refrigerant; and
transferring the refrigerant from the second evaporator to the second compact screw compressor,
wherein the step of collecting condensed water comprises collecting water condensed by both the first evaporator and the second evaporator in the container.

\* \* \* \* \*